US012811846B2

(12) United States Patent
Choi

(10) Patent No.: US 12,811,846 B2
(45) Date of Patent: Nov. 24, 2026

(54) SYSTEM AND METHOD FOR PARALLEL (BUS) COMMUNICATION BETWEEN MULTIPLE DEVICES, AND COMPUTER PROGRAM STORED ON RECORDING MEDIUM FOR EXECUTING THE METHOD

(71) Applicant: SAMSUNG SDI CO., LTD., Yongin-si (KR)

(72) Inventor: Sunho Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 325 days.

(21) Appl. No.: 18/410,309

(22) Filed: Jan. 11, 2024

(65) Prior Publication Data

US 2025/0071017 A1 Feb. 27, 2025

(30) Foreign Application Priority Data

Aug. 22, 2023 (KR) ........................ 10-2023-0109869

(51) Int. Cl.

| | |
|---|---|
| ***H04L 41/0677*** | (2022.01) |
| ***G06F 13/42*** | (2006.01) |
| ***H04L 12/40*** | (2006.01) |

(52) U.S. Cl.

CPC ...... *H04L 41/0677* (2013.01); *G06F 13/4204* (2013.01); *G06F 13/4282* (2013.01); *H04L 12/40169* (2013.01)

(58) Field of Classification Search

CPC ........... H04L 41/0677; H04L 12/40169; H04L 12/40182; G06F 13/4282; G06F 13/4204

See application file for complete search history.

(56) References Cited

U.S. PATENT DOCUMENTS

| | | | | |
|---|---|---|---|---|
| 5,914,957 | A | 6/1999 | Dean et al. | |
| 10,114,787 | B2 * | 10/2018 | Amarilio | H04L 61/5092 |
| 2010/0274945 | A1 | 10/2010 | Westrick, Jr. et al. | |
| 2011/0270566 | A1 * | 11/2011 | Sawada | H01J 49/0031 702/108 |
| 2018/0013578 | A1 | 1/2018 | Gozloo et al. | |
| 2019/0001904 | A1 * | 1/2019 | Sugimoto | B60R 16/0207 |
| 2025/0071017 | A1 * | 2/2025 | Choi | H04L 41/0677 |

FOREIGN PATENT DOCUMENTS

| | | |
|---|---|---|
| EP | 2 571 200 B1 | 10/2019 |
| KR | 10-2266785 | 6/2021 |
| KR | 10-2454755 | 10/2022 |
| KR | 10-2517490 | 3/2023 |

* cited by examiner

*Primary Examiner* — Raj Jain

(74) *Attorney, Agent, or Firm* — Lee IP Law, P.C.

(57) ABSTRACT

A communication system in which a main device and a plurality of sub-devices connected to the main device via a communication network communicate with each other in parallel (BUS), the communication system including a plurality of sub-devices each including a switch configured to open or close a connection of a parallel (BUS) communication line to the main device, and a terminal resistor configured to enable wiring to the parallel (BUS) communication line and the main device connected to the plurality of sub-devices through the parallel (BUS) communication line, and configured to set communication IDs of the plurality of sub-devices and, based on the communication IDs, diagnose a communication failure in the communication network.

13 Claims, 10 Drawing Sheets

SYSTEM AND METHOD FOR PARALLEL (BUS) COMMUNICATION BETWEEN MULTIPLE DEVICES, AND COMPUTER PROGRAM STORED ON RECORDING MEDIUM FOR EXECUTING THE METHOD

CROSS-REFERENCE TO RELATED APPLICATION

The present application claims priority and the benefit of Korean Patent Application No. 10-2023-0109869, filed on Aug. 22, 2023, in the Korean Intellectual Property Office, the entire disclosure of which is incorporated herein by reference.

BACKGROUND

1. Field

Embodiments relate to a parallel (BUS) communication system and method for multiple devices, and a computer program stored on a recording medium to execute the method.

2. Description of the Related Art

In a network configuration in which multiple devices communicate with each other, a communication ID may be set for each device to configure a communication system. For example, in a communication structure in which multiple devices are connected on a 1:N (multiple) basis, a main device sets communication IDs of multiple sub-devices, in order to communicate with the multiple sub-devices. For example, in an Energy Storage System (ESS) including a plurality of battery racks, a system Battery Management System (BMS), which is a main device, communicates with a plurality of rack BMSs, which are sub-devices.

SUMMARY

Embodiments are directed to a communication system in which a main device and a plurality of sub-devices connected to the main device via a communication network communicate with each other in parallel (BUS), the communication system including a plurality of sub-devices each including a switch configured to open or close a connection of a parallel (BUS) communication line to the main device, and a terminal resistor configured to enable wiring to the parallel (BUS) communication line and the main device connected to the plurality of sub-devices through the parallel (BUS) communication line, and configured to set communication IDs of the plurality of sub-devices and, based on the communication IDs, diagnose a communication failure in the communication network.

In embodiments, with respect to a first sub-device that may be first connected to the main device through the parallel (BUS) communication line, through to an nth sub-device sequentially connected to the main device, starting from the first sub-device, the main device may sequentially cut off the switch provided in each sub-device to sequentially wire the parallel (BUS) communication line to the terminal resistor, and connects each sub-device to the communication network to sequentially set the communication ID of each sub-device.

In embodiments, if communication is not established with an (n+1)th sub-device after setting a communication ID of the nth sub-device, the main device may set the nth sub-device as a final sub-device and may terminate communication ID setting.

In embodiments, if communication is not established with an (n+1)th sub-device after setting a communication ID of the nth sub-device, the main device may set the nth sub-device as a final sub-device to be diagnosed, and may diagnose a communication failure by comparing a final sub-device set while setting previous communication IDs with the final sub-device to be diagnosed.

In embodiments, the main device may diagnose a communication failure, based on whether a communication ID of the final sub-device set while setting the previous communication IDs matches a communication ID of the final sub-device to be diagnosed.

In embodiments, the main device may diagnose a communication failure by repeatedly performing, starting from a preset mth sub-device, if communication with a sub-device is established, a first operation of identifying whether communication with a sub-device of a preset number of sub-devices after the sub-device is possible, and if communication with the sub-device is not established, a second operation of identifying whether communication with a sub-device of a preset number of sub-devices before the sub-device is possible.

In embodiments, if a communication ID of a sub-device capable of communication is k and a communication ID of a sub-device incapable of communication is k+1, the main device may diagnose a communication failure between the sub-device with the communication ID k and the sub-device with the communication ID k+1.

Embodiments are directed to a communication method in which a main device and a plurality of sub-devices connected to the main device communicate with each other in parallel (BUS), the communication method including setting communications IDs of a plurality of sub-devices each including a switch configured to open or close a connection of a parallel (BUS) communication line to the main device, and a terminal resistor configured to enable wiring to the parallel (BUS) communication line and diagnosing a communication failure in the communication network, based on the communication IDs.

In embodiments, the setting of the communication IDs may include, with respect to a first sub-device that is first connected to the main device through the parallel (BUS) communication line, through to an nth sub-device sequentially connected to the main device, starting from the first sub-device, sequentially cutting off the switch provided in each sub-device to sequentially wire the parallel (BUS) communication line to the terminal resistor and connecting each sub-device to the communication network and sequentially setting the communication IDs of the plurality of sub-devices.

In embodiments, the setting of the communication IDs may include setting the nth sub-device as a final sub-device and terminating communication ID setting if communication is not established with an (n+1)th sub-device after setting a communication ID of the nth sub-device.

In embodiments, the diagnosing of a communication failure may include, if communication is not established with an (n+1)th sub-device after setting a communication ID of the nth sub-device, setting the nth sub-device as a final sub-device to be diagnosed and diagnosing a communication failure by comparing a final sub-device that is set while setting previous communication IDs, with the final sub-device to be diagnosed.

In embodiments, the diagnosing of a communication failure may include diagnosing a communication failure, based on whether a communication ID of the final sub-device set while setting the previous communication IDs matches a communication ID of the final sub-device to be diagnosed.

In embodiments, the diagnosing of the communication failure may include starting from a preset mth sub-device a first operation of identifying, if communication with a sub-device is established, whether communication with a sub-device of a preset number of sub-devices after the sub-device is possible, a second operation of identifying, if communication with the sub-device is not established, whether communication with a sub-device of a preset number of sub-devices before the sub-device is possible, and diagnosing a communication failure by repeatedly performing the first operation and the second operation.

In embodiments, the diagnosing of a communication failure may include, if a communication ID of a sub-device capable of communication is k and a communication ID of a sub-device incapable of communication is k+1, diagnosing a communication failure between the sub-device with the communication ID k and the sub-device with the communication ID k+1.

Embodiments are directed to a computer program stored on a recording medium to execute the method as claimed in 8 by using a computing device.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
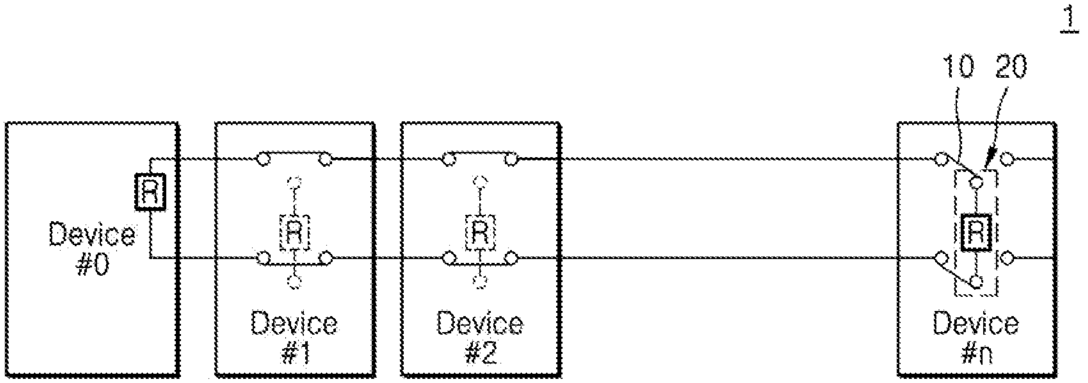
FIG. 1 is a diagram schematically illustrating components of a parallel (BUS) communication system according to embodiments.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

Also, elements not related to description are omitted in the drawings for clear description of the present disclosure, and like reference numerals in the drawings denote like elements.

Throughout the specification, it will also be understood that when an element is referred to as being "connected to" another element, it can be directly connected to the other element, or it can be electrically connected to the other element and intervening elements may be present. Also, when an element "includes" another element, unless there is a particular description contrary thereto, the element can further include other elements, not excluding the other elements.

Some embodiments may be described in terms of functional block components and various processing steps. Such functional blocks may be realized by any number of hardware and/or software components configured to perform the specified functions. In an implementation, the functional blocks of the present disclosure may be implemented by one or more microprocessors, or may be implemented by circuit configurations for certain functions. The functional blocks of the present disclosure may be implemented in a variety of programming or scripting languages. The functional blocks of the present disclosure may be implemented as algorithms running on one or more processors. The functions performed by the function blocks of the present disclosure may be performed by a plurality of function blocks, or the functions performed by the plurality of function blocks in the present disclosure may be performed by one function block. In addition, the present disclosure may employ the related art for electronic environment setting, signal processing, and/or data processing.

Figure 2:
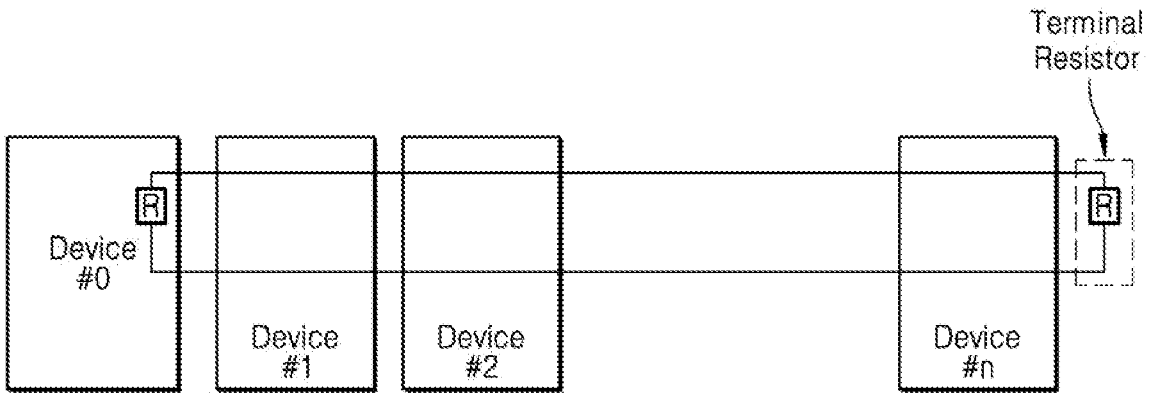
FIG. 2 is a diagram schematically illustrating components of a parallel (BUS) communication system according to the related art.

FIG. 1 is a diagram schematically illustrating components of a parallel (BUS) communication system according to embodiments. FIG. 2 is a diagram schematically illustrating components of a parallel (BUS) communication system according to the related art.

First, referring to FIG. 2, in a parallel (BUS) communication system according to the related art, a main device Device #0 may be connected to a plurality of sub-devices Device #1 to #n through a communication line. For example, as illustrated in FIG. 2, in the parallel (BUS) communication system according to the related art, a terminal resistor may be provided at a final sub-device Device #n provided at the end of a communication line. For example, inside the plurality of sub-devices Device #1 to #n, a communication line may simply be wired in parallel (BUS) while passing through the sub-devices.

In a parallel (BUS) communication system according to the related art, if multiple devices are connected to each other, a terminal resistor may have to be located in a final device, and thus, there may be a prerequisite that a fixed number of communication devices may be set in a communication ID setting method. To apply the communication ID setting method according to the related art, a terminal resistor may be located at the location of a final communication line in a device configured in parallel (BUS) in a corresponding communication network.

In typical parallel (BUS) communication (RS485/422 or CAN, etc.), a terminal resistor may exist in the first and final devices to prevent communication errors. For reference, in regard to the function of a terminal resistor, as difference in the impedance of communication lines may cause mismatch, by installing the terminal resistor, reflection and deterioration of signals caused by reflection of the signals or communication failure due to attenuation may be prevented.

Since a terminal resistor may be required for a final communication device in a parallel (BUS) communication system according to the related art, a terminal resistor circuit may need to be configured at the final stage of a communication device in order to flexibly use multiple communication devices. Another problem may be that if a physical defect in a communication network occurs while communication devices are operating normally after a communication ID is set, all devices wired to the communication network may have a communication failure due to the absence of a terminal resistor at the end of a communication line, hindering normal communication.

Referring to FIG. 1, a communication system 1 in which a main device Device #0 and a plurality of sub-devices Device #1 to #n connected to each other through a communication network communicate in parallel (BUS) is illustrated. In the communication system 1 according to embodiments, the main device Device #0 may be connected to the plurality of sub-devices Device #1 to #n through a communication line. In an implementation, as illustrated in FIG. 1, the plurality of sub-devices Device #1 to #n may each include a switch 10 and a terminal resistor 20.

The main device Device #0 may be connected to the plurality of sub-devices Device #1 to #n through a parallel (BUS) communication line. Additionally, the main device Device #0 may set communication IDs of the plurality of sub-devices Device #1 to #n, respectively. In an implementation, the main device Device #0 may diagnose a communication failure in the communication network based on the communication IDs.

The switch 10 may open or close the connection of the parallel (BUS) communication line to the main device Device #0. In an implementation, the plurality of sub-devices Device #1 to #n may include the switch 10 for blocking a communication line and wiring a terminal resistor, in each communication line. In some embodiments, the switch 10 may allow the terminal resistor 20 to be wired to the communication line by opening or closing of the switch 10.

The terminal resistor 20 may be in each of the plurality of sub-devices Device #1 to #n. In an implementation, the terminal resistor 20 may be configured to be wired to the parallel (BUS) communication line.

The main device Device #0 and the plurality of sub-devices Device #1 to #n according to embodiments of the present disclosure may each include a communication module, a processor, and a memory.

The processor may control communication between each device. The processor may also control the opening and closing operations of the switch 10. In an implementation, the processor may be implemented in a form that selectively includes an Application-Specific Integrated Circuit (ASIC), another chipset, logic circuit, register, a communication modem, and/or a data processing device, which are known in the art to be suitable. The processor may perform basic arithmetic, logic, and input/output operations and, e.g., execute program code stored in memory. The processor may store data in a memory or load data stored in a memory.

The memory may be a recording medium that may be read by the processor and may include a non-permanent mass storage device such as random access memory (RAM), read only memory (ROM), and a disk drive. An operating system and at least one program or application code may be stored in the memory. Program code for parallel (BUS) communication may be stored in the memory according to embodiments.

The main device Device #0 and the plurality of sub-devices Device #1 to #n may further include a communication module. In an implementation, the main device Device #0 and the plurality of sub-devices Device #1 to #n may exchange data with each other using a communication module.

A communication method of the communication module may include a communication method that utilizes a communication network (e.g., a mobile communication network, wired Internet, wireless Internet, a broadcasting network) that a network may include, and may also include short-range wireless communication between devices. In an implementation, the network may include any one or more networks among a personal area network (PAN), a local area network (LAN), a campus area network (CAN), a metropolitan area network (MAN), a wide area network (WAN), a broadband network (BBN), the Internet, and the like. In some embodiments, the network may include any one or more network topologies including, e.g., a bus network, a star network, a ring network, a mesh network, a star-bus network, a tree or a hierarchical network, and the like.

Also, a communication system according to the present disclosure may include an input/output interface. The input/output interface may be an element used to interface with an input/output device. In an implementation, an input device may include a device such as a keyboard or a mouse, and an output device may include a device such as a display for displaying a communication session of an application. In an implementation, the input/output interface may be an element used to interface with a device in which inputting and outputting functions are integrated, such as a touch screen.

Figure 3:
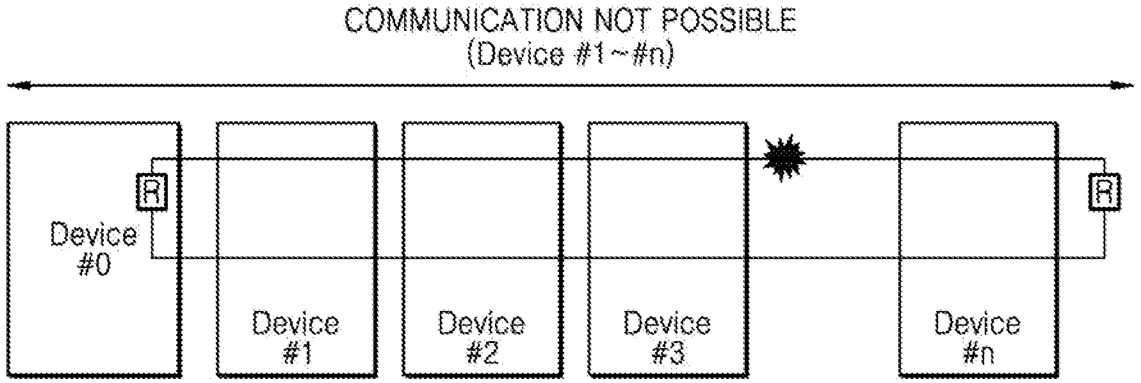
FIG. 3 is a diagram for describing a communication failure in a parallel (BUS) communication system according to the related art.
Figure 4:
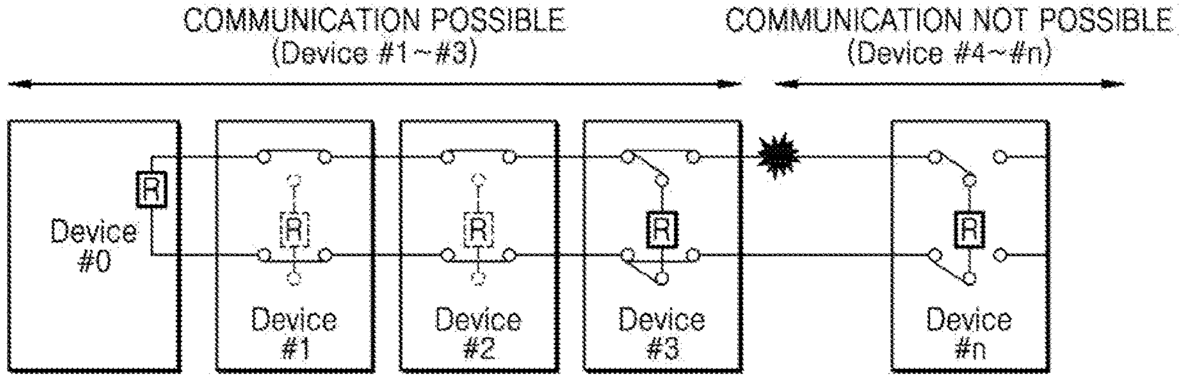
FIG. 4 is a diagram for describing a communication failure in a parallel (BUS) communication system according to embodiments.

FIG. 3 is a diagram for describing a communication failure in a parallel (BUS) communication system according to the related art. FIG. 4 is a diagram for describing a communication failure in a parallel (BUS) communication system according to embodiments.

First, referring to FIG. 3, if a communication failure occurs in a parallel (BUS) communication system according to the related art, all devices wired to a communication network may become unable to communicate. For example, as illustrated in FIG. 3, if a failure occurs in a communication network (e.g., disconnection, etc.), all devices wired to the communication network may have a communication failure due to the absence of a terminal resistor at the end of a communication line, thereby hindering normal communication.

Referring to FIG. 4, if a communication failure occurs in a parallel (BUS) communication system according to embodiments, communication may be possible through terminal resistor wiring.

If communication with the (n+1)th sub-device Device #(n+1) is not established after setting a communication ID of the nth sub-device Device #n, the main device Device #0 according to embodiments may set the nth sub-device Device #n as the final sub-device to be diagnosed. In an implementation, as illustrated in FIG. 4, if a communication failure occurs between the third sub-device Device #3 and the fourth sub-device Device #4, and if communication with the fourth sub-device Device #4 is not established after setting a communication ID of the third sub-device Device #3, the main device Device #0 may set the third sub-device Device #3 as the final sub-device to be diagnosed.

In some embodiments, the main device Device #0 according to embodiments of the present disclosure may diagnose a communication failure by comparing a final sub-device set while setting previous communication IDs, and the final sub-device to be diagnosed. In an implementation, as illustrated in FIG. 4, if a communication failure occurs between the third sub-device Device #3 and the fourth sub-device Device #4, the main device Device #0 may diagnose a communication failure by comparing the final sub-device Device #n set while setting previous communication IDs with the final sub-device to be diagnosed (Device #3).

In some embodiments, the main device Device #0 according to embodiments of the present disclosure may diagnose a communication failure based on whether a communication ID of the final sub-device set while setting previous communication IDs matches that of a final sub-device to be diagnosed. In an implementation, as illustrated in FIG. 4, the main device Device #0 may diagnose a communication failure, because the communication ID of the final sub-device Device #n set while setting the previous communication IDs and that of the final sub-device to be diagnosed (Device #3) do not match each other.

Referring to FIGS. 3 and 4 together, in the communication system according to the present disclosure, even if a communication failure occurs in the middle of the communication line, communication may be possible due to the terminal resistor in each sub-device and the terminal resistor wiring effect by a switch. In an implementation, as illustrated in FIG. 4, the switch in a sub-device may allow a terminal resistor in a sub-device to be wired to the communication line by opening or closing of the switch.

Figure 5:
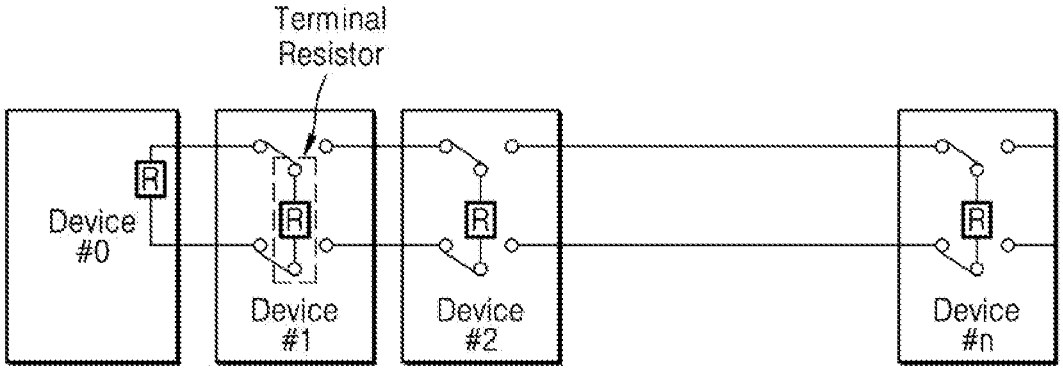
FIGS. 5 to 7 are diagrams for describing a method of setting a communication ID, according to embodiments.
Figure 6:
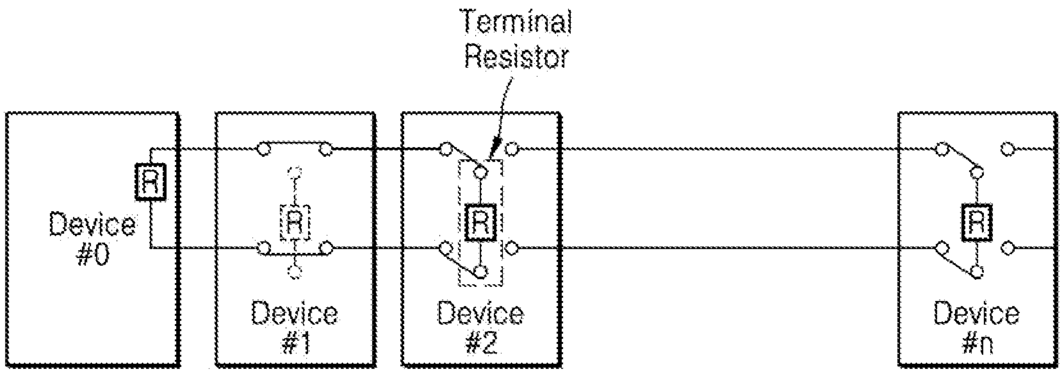
Figure 7:
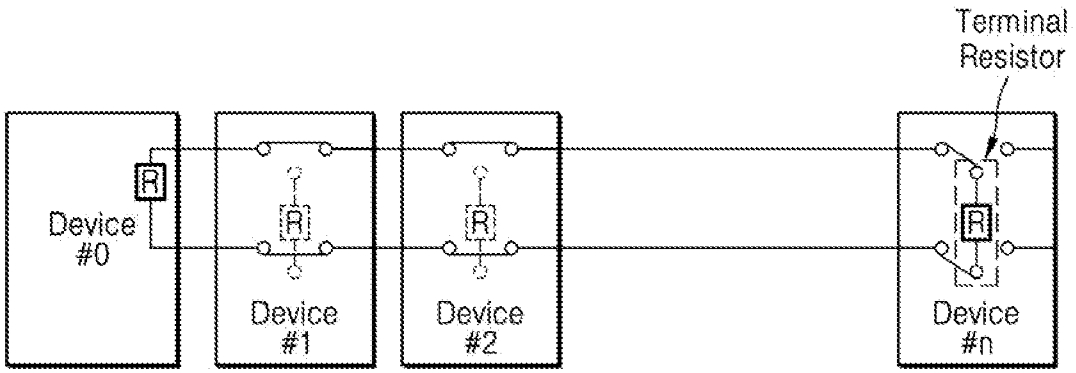

FIGS. 5 to 7 are diagrams for describing a method of setting a communication ID, according to embodiments.

With respect to a first sub-device that is first connected to the main device Device #0 through a parallel (BUS) communication line, through to an nth sub-device sequentially connected thereto, starting from the first sub-device, the main device Device #0 according to embodiments may sequentially cut off a switch provided in each sub-device to sequentially wire the parallel (BUS) communication line to a terminal resistor, and connect each sub-device to a communication network to sequentially set a communication ID of each sub-device.

If communication is not established with an (n+1)th sub-device after setting the communication ID of the nth sub-device, the main device Device #0 may set the nth sub-device as the final sub-device and terminate communication ID setting. In an implementation, a terminal resistor of the first sub-device Device #1 in FIG. 5, a terminal resistor of the second sub-device Device #2 in FIG. 6, and a terminal resistor of the nth sub-device Device #n in FIG. 7 may be sequentially wired, and thus, communication IDs of the sub-devices may be set sequentially.

Figure 8:
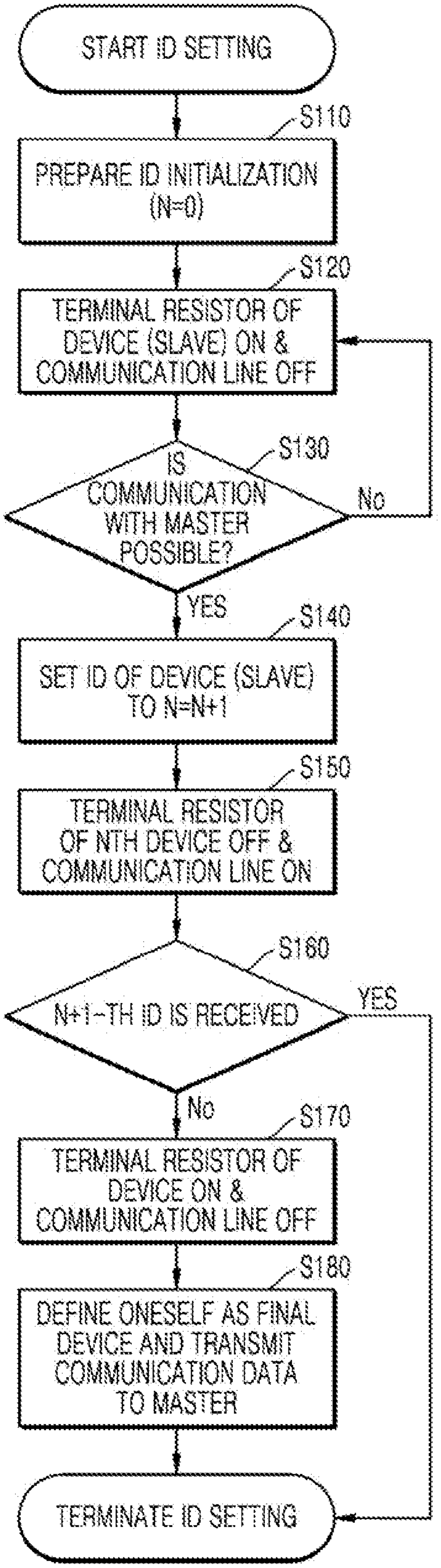
FIG. 8 is a flowchart of a method for setting a communication ID, according to embodiments.

FIG. 8 is a flowchart of a method for setting a communication ID, according to embodiments.

Referring to FIG. 8, in operation S110, in a setting initialization state, all sub-devices of a communication network may be opened and terminal resistors may be wired.

In operations S120 and S130, as a device capable of communication in an initialized state may be a first sub-device, and a communication ID #1 of the first sub-device may be set.

If a communication ID is set to the first sub-device, the first sub-device may be connected to the communication network and may communicate with a main device. If communication connection between the first sub-device and the main device is impossible, the main device may wait until communication is established with the first sub-device. In some embodiments, if communication connection with the main device is possible, the communication ID #1 of the first sub-device may be set.

In operations S140 and S150, communication with the nth sub-device may be possible and a communication ID #n may be set to the nth sub-device. In some embodiments, if a communication ID is set to the nth sub-device, the nth sub-device may be connected to the communication network and the terminal resistor may be opened. Next, communication ID setting for an (n+1)th sub-device may be performed.

In operation S160, if the nth sub-device receives communication indicating that the communication ID of the (n+1)th sub-device has been assigned, the communication ID setting for the nth sub-device may be completed.

In operations S170 and S180, if the communication ID of the (n+1)th sub-device is not assigned, the nth sub-device may be recognized as the final communication device, the terminal resistor of the nth sub-device may be wired, and communication ID setting may be completed.

Figure 9:
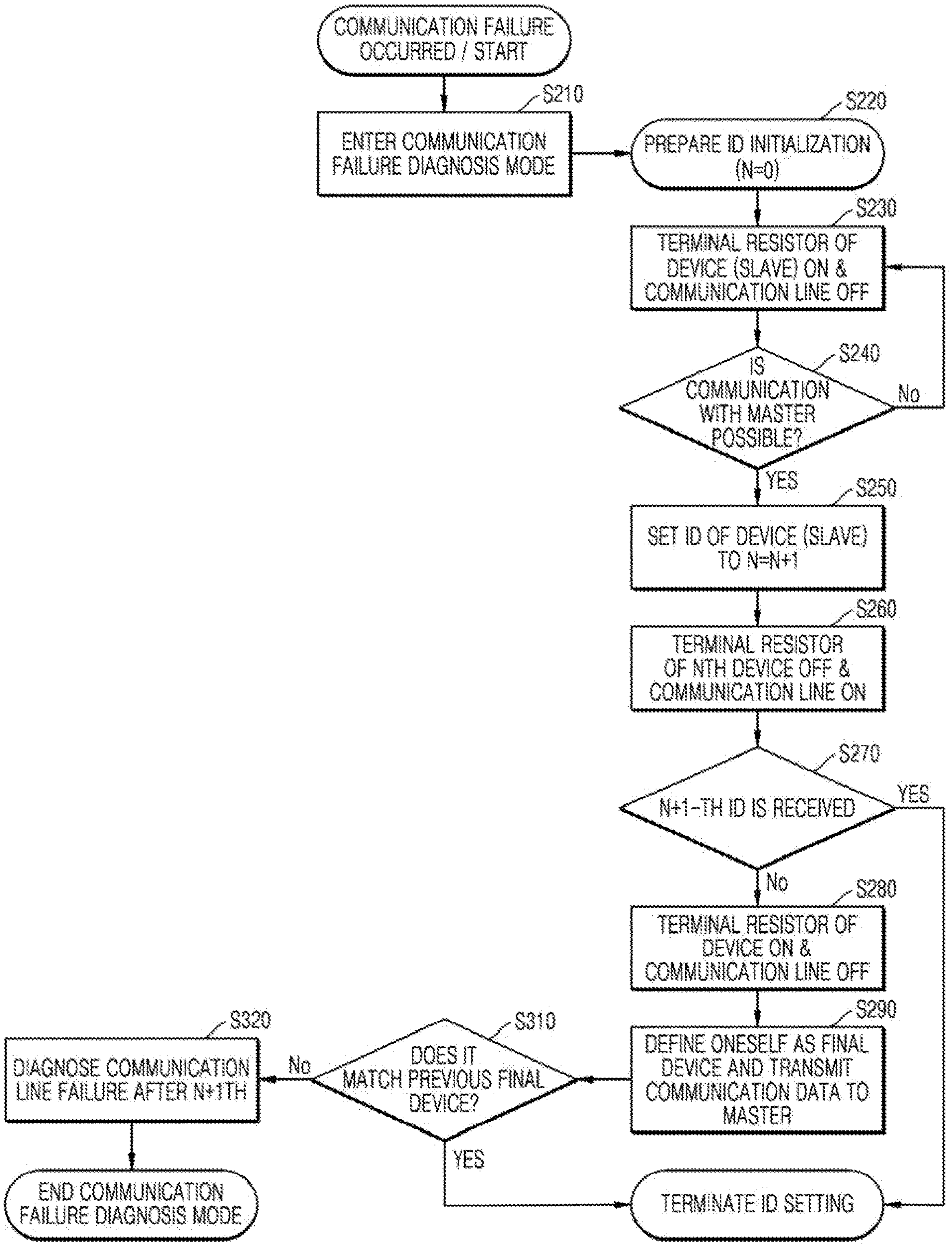
FIG. 9 is a flowchart of a method for diagnosing a communication failure, according to embodiments.

FIG. 9 is a flowchart of a method for diagnosing a communication failure, according to embodiments.

Referring to FIG. 9, in operation S210, a main device may enter a communication failure diagnosis mode. In operation S220, as a setting initialization state in which the communication ID may be initialized, all sub-devices of a communication network may be opened and a terminal resistor may be wired.

In operations S230 and S240, a device capable of communication in an initialized state may be a first sub-device, and a communication ID #1 of the first sub-device may be set.

If a communication ID is set to the first sub-device, the first sub-device may be connected to the communication network and may communicate with the main device. If communication connection between the first sub-device and the main device is not possible, the main device may wait until communication is established with the first sub-device. In some embodiments, if communication connection with the main device is possible, the communication ID #1 of the first sub-device may be set.

In operations S250 and S260, communication with the nth sub-device may be possible and a communication ID #n may be set to the nth sub-device. In some embodiments, if a communication ID is set to the nth sub-device, the nth sub-device may be connected to the communication network and a terminal resistor may be opened. Next, the communication ID setting for an (n+1)th sub-device may be performed.

In operation S270, if the nth sub-device receives a communication indicating that the communication ID of the (n+1)th sub-device has been assigned, the communication ID setting for the nth sub-device may be terminated.

In operations S280 and S290, if the communication ID of the (n+1)th sub-device is not assigned, the nth sub-device may be recognized as a final communication device.

In operation S310, it may be determined whether the communication ID of the final communication device recognized while diagnosing a communication failure matches the communication ID of the final communication device set while setting previous communication IDs. If the communication ID of the final communication device recognized while diagnosing a communication failure matches the communication ID of the final communication device set while setting the previous communication IDs, it is diagnosed that no communication failure has occurred, and the communication ID setting is terminated.

In operation S320, if the communication ID of the final communication device, which may be recognized while diagnosing a communication failure, does not match the communication ID of the final communication device, which may be set while setting the previous communication IDs, it may be diagnosed that a communication failure has occurred, and that a communication line defect has occurred at the location of a communication line after the final communication device recognized while diagnosing a communication failure.

Figure 10:
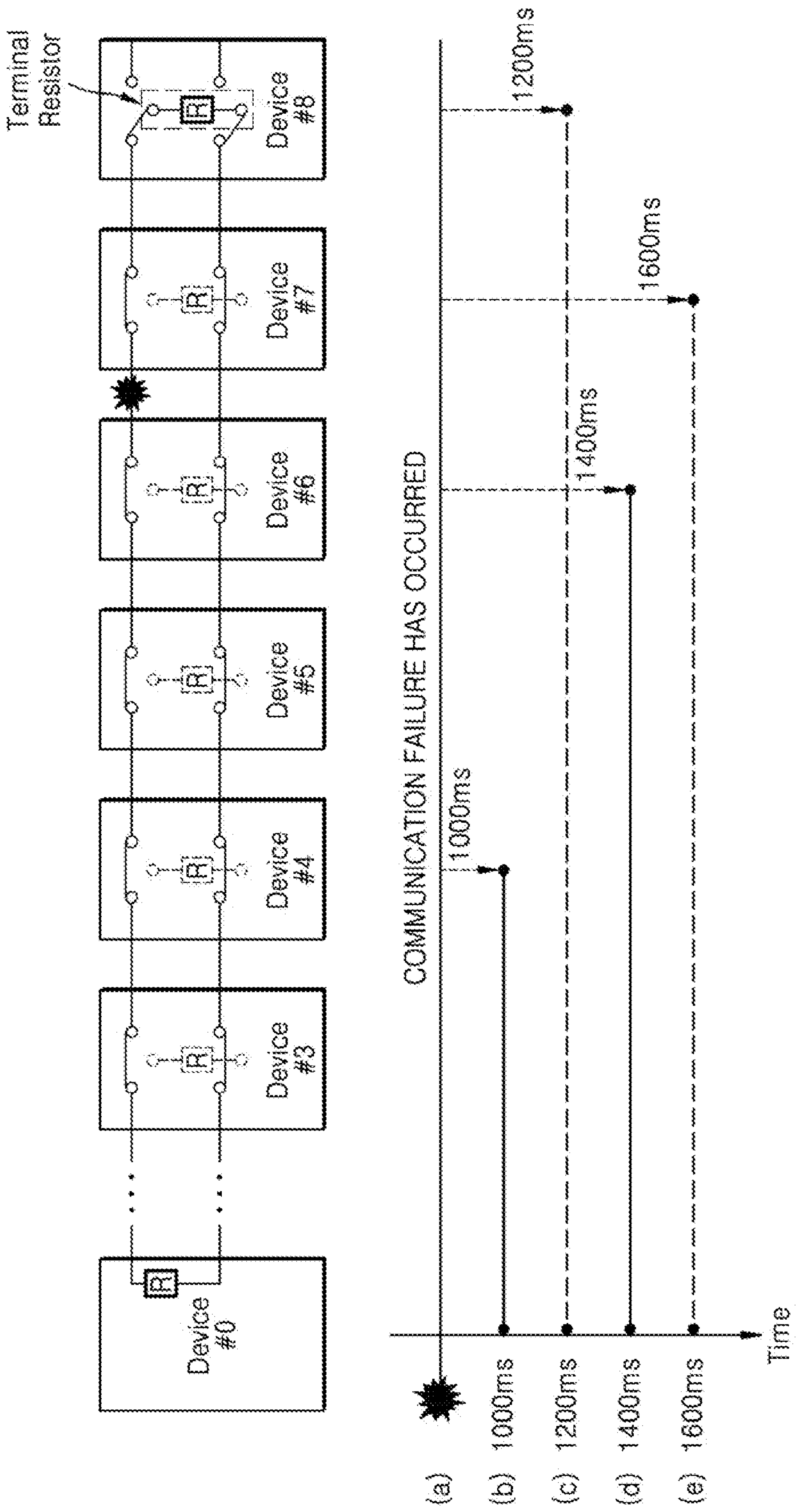
FIG. 10 is a diagram for describing a method of diagnosing a communication failure, according to embodiments.

FIG. 10 is a diagram for describing a method of diagnosing a communication failure, according to embodiments.

Referring to FIG. 10, a main device according to embodiments may determine, if communication is established with a sub-device, starting from a preset mth sub-device, whether communication may be possible with a sub-devices of a preset number of sub-devices after the sub-device. In an implementation, if communication is not established with the sub-device, the main device may determine whether communication may be possible with a sub-device of a preset number of sub-devices before the sub-device. The main device may diagnose a communication failure by repeatedly performing a process of checking whether communication may be possible.

In some embodiments, if a communication ID of a sub-device capable of communication is k and a communication ID of a sub-device incapable of communication is k+1, the main device may determine a communication failure between the sub-device with the communication ID k and the sub-device with the communication ID k+1.

In an implementation, as illustrated in FIG. 10, starting from a preset, fourth sub-device, if communication is established with the fourth sub-device, the main device may determine whether communication with an eighth sub-device, which may be a sub-device of a preset number of four after the fourth sub-device, may be possible. If communication is not established with the eighth sub-device, the main device may determine whether communication may be possible with a sixth sub-device, which may be a preset number of two before the eighth sub-device. If communication is established with the sixth sub-device, the main device may determine whether communication may be possible with a seventh sub-device, which is a sub-device of a preset number of one after the sixth sub-device. If communication with the seventh sub-device is not established, the main device may diagnose that a communication failure has occurred between the sixth sub-device and the seventh sub-device.

According to the present disclosure, by including, in a sub-device, a terminal resistor that was previously installed manually in the final communication device in a communication network, installation time and man-hours may be reduced by determining the final communication device by itself and automatically setting the terminal resistor.

According to the present disclosure, if communication is impossible due to a defect in a communication line or communication devices even during a normal operation of the communication devices, the location of the defect may be identified by itself using a fault diagnosis algorithm, and the location of the fault may be transmitted, thereby minimizing maintenance time and man-hours.

If multiple communication devices communicate with each other, in the related art, a communication failure may occur in all communication devices connected to a communication line, if a failure (disconnection, short circuit, etc.) occurred anywhere in the communication line. However, according to the present disclosure, the fault location of the communication line may be determined by itself and the communication line may be removed and a terminal resistor may be wired at the stage before the faulty communication line, thereby allowing communication until the location of the communication line defect.

The various embodiments described above are examples, and are not necessarily be distinguished from each other and independently implemented. The embodiments described in the present specification may be implemented in a combination with each other.

Various embodiments described above may be implemented in the form of a computer program that may be executed on a computer through various components, and such a computer program may be recorded on a computer-readable medium. In this case, the medium may continuously store a program executable by a computer or temporarily store the program for execution or download. In some embodiments, the medium may be various recording means or storage means in the form of single hardware or combined hardware including multiple pieces of hardware, but is not limited to a medium directly connected to a certain computer system, and may be distributed on a network. Examples of the medium include magnetic media such as hard disks, floppy disks and magnetic tapes, optical recording media such as compact disc-ROM (CD-ROM) and digital versatile disc (DVD), magneto-optical media such as floptical disks, and ROM, RAM, flash memory, etc. configured to store program instructions. In some embodiments, examples of other media include recording media or storage media managed by an app store that distributes applications, a site or a server for supplying or distributing various other software.

In the present specification, "unit", "module", etc. may be a hardware component such as a processor or circuit, and/or a software component executed by a hardware component such as a processor. Thus, the "unit", "module" may be implemented by, for example, components such as software components, object-oriented software components, class components and task components, and processes, functions, attributes, procedures, subroutines, segments of program codes, drivers, firmware, microcode, circuits, data, database, data structures, tables, arrays, and variables.

According to the present disclosure, a communication system and method for effective parallel (BUS) communication between a plurality of devices, and a computer program stored in a recording medium for executing the method may be provided.

By way of summation and review, if there are a large number of devices constituting a communication system, it may be difficult to set a communication ID by communicating 1:1 with each device. To solve this problem, a method of automatically assigning a communication ID by applying a specific program to manually connect only one communication line to each device may be used. Communication IDs may be set by manually or semi-automatically applying power to each communication device one by one while a communication line is connected to each device.

One or more embodiments may include a parallel (BUS) communication system and method for multiple devices, and a computer program stored in a recording medium for executing the method.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A communication system in which a main device and a plurality of sub-devices connected to the main device via a communication network communicate with each other in parallel (BUS), the communication system comprising:

the plurality of sub-devices each including a switch configured to open or close a connection of a parallel (BUS) communication line to the main device, and a terminal resistor configured to enable wiring to the parallel (BUS) communication line; and the main device connected to the plurality of sub-devices through the parallel (BUS) communication line, and configured to set communication IDs of the plurality of sub-devices and, based on the communication IDs, diagnose a communication failure in the communication network, wherein, with respect to a first sub-device that is first connected to the main device through the parallel (BUS) communication line, through to an nth sub-device sequentially connected to the main device, starting from the first sub-device, the main device sequentially cuts off the switch provided in each of the first through the nth sub-devices to sequentially wire the parallel (BUS) communication line to the terminal resistor, and connects each of the first through the nth sub-device to the communication network to sequentially set the communication IDs of each of the first through the nth sub-device.

2. The communication system as claimed in claim 1, wherein, if communication is not established with an (n+1)th sub-device after setting a communication ID of the nth sub-device, the main device sets the nth sub-device as a final sub-device and terminates communication ID setting.

3. The communication system as claimed in claim 1, wherein, if communication is not established with an (n+1)th sub-device after setting a communication ID of the nth sub-device, the main device sets the nth sub-device as a final sub-device to be diagnosed, and diagnoses the communication failure by comparing a final sub-device set while setting previous communication IDs with the final sub-device to be diagnosed.

4. The communication system as claimed in claim 3, wherein the main device diagnoses the communication failure, based on whether a communication ID of the final sub-device set while setting the previous communication IDs matches a communication ID of the final sub-device to be diagnosed.

5. The communication system as claimed in claim 1, wherein the main device diagnoses the communication failure by repeatedly performing, starting from a preset mth sub-device, if communication with a sub-device is established, a first operation of identifying whether communication with a sub-device of a preset number of sub-devices after the sub-device is possible, and if communication with the sub-device is not established, a second operation of identifying whether communication with a sub-device of a preset number of sub-devices before the sub-device is possible.

6. The communication system as claimed in claim 5, wherein, if a communication ID of a sub-device capable of communication is k and a communication ID of a sub-device incapable of communication is k+1, the main device diagnoses the communication failure between the sub-device with the communication ID k and the sub-device with the communication ID k+1.

7. A communication method in which a main device and a plurality of sub-devices connected to the main device communicate with each other in parallel (BUS), the communication method comprising:

setting communications IDs of the plurality of sub-devices each including a switch configured to open or close a connection of a parallel (BUS) communication line to the main device, and a terminal resistor configured to enable wiring to the parallel (BUS) communication line; and diagnosing a communication failure in a communication network, based on communication IDS, wherein the setting of the communication IDs includes:

with respect to a first sub-device that is first connected to the main device through the parallel (BUS) communication line, through to an nth sub-device sequentially connected to the main device, starting from the first sub-device, sequentially cutting off the switch provided in each sub-device to sequentially wire the parallel (BUS) communication line to the terminal resistor, and connecting each sub-device to the communication network and sequentially setting the communication IDs of the plurality of sub-devices.

8. The communication method as claimed in claim 7, wherein the setting of the communication IDs includes setting the nth sub-device as a final sub-device and terminating communication ID setting if communication is not established with an (n+1)th sub-device after setting a communication ID of the nth sub-device.

9. The communication method as claimed in claim 7, wherein the diagnosing of the communication failure includes:

if communication is not established with an (n+1)th sub-device after setting a communication ID of the nth sub-device, setting the nth sub-device as a final sub-device to be diagnosed; and diagnosing a communication failure by comparing a final sub-device that was set while setting previous communication IDs, with the final sub-device to be diagnosed.

10. The communication method as claimed in claim 9, wherein the diagnosing of the communication failure includes diagnosing the communication failure, based on whether a communication ID of the final sub-device set while setting the previous communication IDs matches a communication ID of the final sub-device to be diagnosed.

11. The communication method as claimed in claim 7, wherein the diagnosing of the communication failure includes, starting from a preset mth sub-device:

a first operation of identifying, if communication with a sub-device is established, whether communication with a sub-device of a preset number of sub-devices after the sub-device is possible;

a second operation of identifying, if communication with the sub-device is not established, whether communication with a sub-device of a preset number of sub-devices before the sub-device is possible; and diagnosing the communication failure by repeatedly performing the first operation and the second operation.

12. The communication method as claimed in claim 11, wherein the diagnosing of the communication failure includes, if a communication ID of a sub-device capable of communication is k and a communication ID of a sub-device incapable of communication is k+1, diagnosing the communication failure between the sub-device with the communication ID k and the sub-device with the communication ID k+1.

13. A computer program stored on a recording medium to execute the method as claimed in 7 by using a computing device.

* * * * *